(12) United States Patent
Namba et al.

(10) Patent No.: US 11,101,474 B2
(45) Date of Patent: Aug. 24, 2021

(54) FUEL CELL SYSTEM AND CONTROL METHOD OF FUEL CELL SYSTEM

(71) Applicant: TOYOTA JIDOSHA KABUSHIKI KAISHA, Toyota (JP)

(72) Inventors: Ryouichi Namba, Okazaki (JP); Shuya Kawahara, Toyota (JP); Norihiro Fukaya, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 328 days.

(21) Appl. No.: 16/276,748

(22) Filed: Feb. 15, 2019

(65) Prior Publication Data
US 2019/0267645 A1 Aug. 29, 2019

(30) Foreign Application Priority Data
Feb. 23, 2018 (JP) .............................. JP2018-030464

(51) Int. Cl.
*H01M 8/04119* (2016.01)
*H01M 8/0438* (2016.01)
*H01M 8/0432* (2016.01)

(52) U.S. Cl.
CPC ... *H01M 8/04134* (2013.01); *H01M 8/04141* (2013.01); *H01M 8/04335* (2013.01); *H01M 8/04358* (2013.01); *H01M 8/04395* (2013.01); *H01M 8/04425* (2013.01)

(58) Field of Classification Search
CPC ......... H01M 8/04134; H01M 8/04358; H01M 8/04395; H01M 8/04425
See application file for complete search history.

(56) References Cited

U.S. PATENT DOCUMENTS

2005/0118467 A1  6/2005 Ojima et al.

FOREIGN PATENT DOCUMENTS

| JP | 2004-165087 A | 6/2004 |
| JP | 2005-158647 A | 6/2005 |
| JP | 2005-183281 A | 7/2005 |

*Primary Examiner* — Helen Oi K Conley
(74) *Attorney, Agent, or Firm* — Dickinson Wright, PLLC

(57) ABSTRACT

A fuel cell system includes a fuel cell, an oxidant gas supply and discharge system, a coolant circulation system, a compressor, an atmospheric pressure sensor, and a control unit. When a measured atmospheric pressure becomes lower than a predetermined reference atmospheric pressure, the control unit executes temperature and pressure lowering control for controlling the coolant circulation system to lower the temperature of the fuel cell while controlling a pressure-regulating valve to lower a delivery pressure of the compressor.

3 Claims, 6 Drawing Sheets

FUEL CELL SYSTEM AND CONTROL METHOD OF FUEL CELL SYSTEM

INCORPORATION BY REFERENCE

The disclosure of Japanese Patent Application No. 2018-030464 filed on Feb. 23, 2018 including the specification, drawings and abstract is incorporated herein by reference in its entirety.

BACKGROUND

1. Technical Field

The present disclosure relates to techniques for fuel cell systems, and more particularly relates to a fuel cell system and a control method of the fuel cell system.

2. Description of Related Art

A technique for suppressing power consumption of a compressor that pumps out oxidant gas in a fuel cell vehicle has conventionally been known. In the technique, when the atmospheric pressure is lower than a reference pressure value, an inlet pressure of a cathode of a fuel cell is lowered (Japanese Patent Application Publication No. 2005-158647 (JP 2005-158647 A)).

SUMMARY

When the inlet pressure of the cathode is lowered, the amount of water vapor, discharged from the fuel cell together with cathode exhaust gas, increases. When the amount of water vapor discharged from the fuel cell increases, a wet state of the fuel cell may possibly have a large deviation from an ideal wet state that is free from occurrence of drying up. In this case, when a humidifier for humidifying the inside of the fuel cell is provided in order to maintain the ideal wet state, the cost of the fuel cell system increases.

(1) A first aspect of the present disclosure relates to a fuel cell system including a fuel cell, an oxidant gas passage, an oxidant gas supply and discharge system, a coolant circulation system, an atmospheric pressure sensor, and a control unit. The fuel cell has an anode, a cathode, and an electrolyte membrane. The oxidant gas passage is for supplying oxidant gas to the cathode and discharging the oxidant gas from the cathode. The oxidant gas supply and discharge system has a compressor provided on an upstream side of the fuel cell in the oxidant gas passage, and a pressure-regulating valve provided on a downstream side of the fuel cell in the oxidant gas passage. The coolant circulation system circulates a coolant that regulates the temperature of the fuel cell. The atmospheric pressure sensor measures an atmospheric pressure. The control unit controls operation of the fuel cell system with use of the measured atmospheric pressure measured by the atmospheric pressure sensor. When the measured atmospheric pressure becomes lower than a predetermined reference atmospheric pressure, the control unit executes temperature and pressure lowering control in which the coolant circulation system is controlled to lower the temperature of the fuel cell while the pressure-regulating valve is controlled to lower a delivery pressure of the compressor. According to the aspect, a possibility of increase in the power consumption of the compressor can be reduced by lowering the delivery pressure of the compressor as the measured atmospheric pressure becomes lower than the reference atmospheric pressure. According to the aspect, the temperature of the fuel cell is lowered as the measured atmospheric pressure becomes lower than the reference atmospheric pressure. This makes it possible to reduce a possibility that the electrolyte membrane dries up when the delivery pressure is lowered. Thus, the above aspect can reduce the possibility of drying up of the electrolyte membrane, while reducing the possibility of increase in the power consumption of the compressor, without installation of a humidifier.

(2) The control unit may be configured to change an operating point to an operating point after lowering, without execution of the temperature and pressure lowering control, when the operating point after lowering is positioned outside a surging region where surging occurs in the compressor, the operating point after lowering being an operating point defined with a delivery flow rate of the compressor and a pressure ratio after the measured atmospheric pressure becomes lower than the reference atmospheric pressure, and execute the temperature and pressure lowering control such that the operating point is outside the surging region, when the operating point after lowering is positioned within the surging region. With this configuration, when the operating point after lowering is positioned within the surging region, the compressor is operable at the operating point positioned outside the surging region by execution of the temperature and pressure lowering control. According to the aspect, when the operating point after lowering is positioned outside the surging region, the temperature and pressure lowering control is not executed. Hence, it becomes possible to cause the fuel cell to generate electric power under the temperature condition that offers sufficient power generation efficiency of the fuel cell without executing temperature control in the temperature and pressure lowering control.

(3) The fuel cell system may further include a storage unit that is configured to store a map that associates a request current value of the fuel cell, the measured atmospheric pressure, and a target temperature of the fuel cell. The target temperature of the fuel cell may be set to a temperature that does not cause the electrolyte membrane to dry up when the delivery pressure of the compressor is lowered with decrease of the measured atmospheric pressure. In the temperature and pressure lowering control, the control unit may control the coolant circulation system to regulate the temperature of the fuel cell to be the target temperature that is defined with the request current value and the measured atmospheric pressure by referring to the map. With this configuration, the control unit can execute, by referring to the map, the temperature and pressure lowering control that can suppress drying up in the electrolyte membrane when the delivery pressure of the compressor is lowered.

(4) A second aspect of the present disclosure relates to a control method of a fuel cell system. The fuel cell system includes a fuel cell, an oxidant gas passage, an oxidant gas supply and discharge system, a coolant circulation system, and an atmospheric pressure sensor. The fuel cell has an anode, a cathode, and an electrolyte membrane. The oxidant gas passage is for supplying oxidant gas to the cathode and discharging the oxidant gas from the cathode. The oxidant gas supply and discharge system has a compressor provided on an upstream side of the fuel cell in the oxidant gas passage, and a pressure-regulating valve provided on a downstream side of the fuel cell in the oxidant gas passage. The coolant circulation system circulates a coolant that regulates the temperature of the fuel cell. The atmospheric pressure sensor measures an atmospheric pressure. The control method includes, when the measured atmospheric pressure measured by the atmospheric pressure sensor becomes lower than a predetermined reference atmospheric pressure, executing temperature and pressure lowering control in which the coolant circulation system is controlled to lower the temperature of the fuel cell, while the pressure-regulating valve is controlled to lower a delivery pressure of the compressor.

The present disclosure can be implemented in various aspects other than the aspects disclosed above. For example, the present disclosure can be implemented in the aspects, such as a vehicle mounted with a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
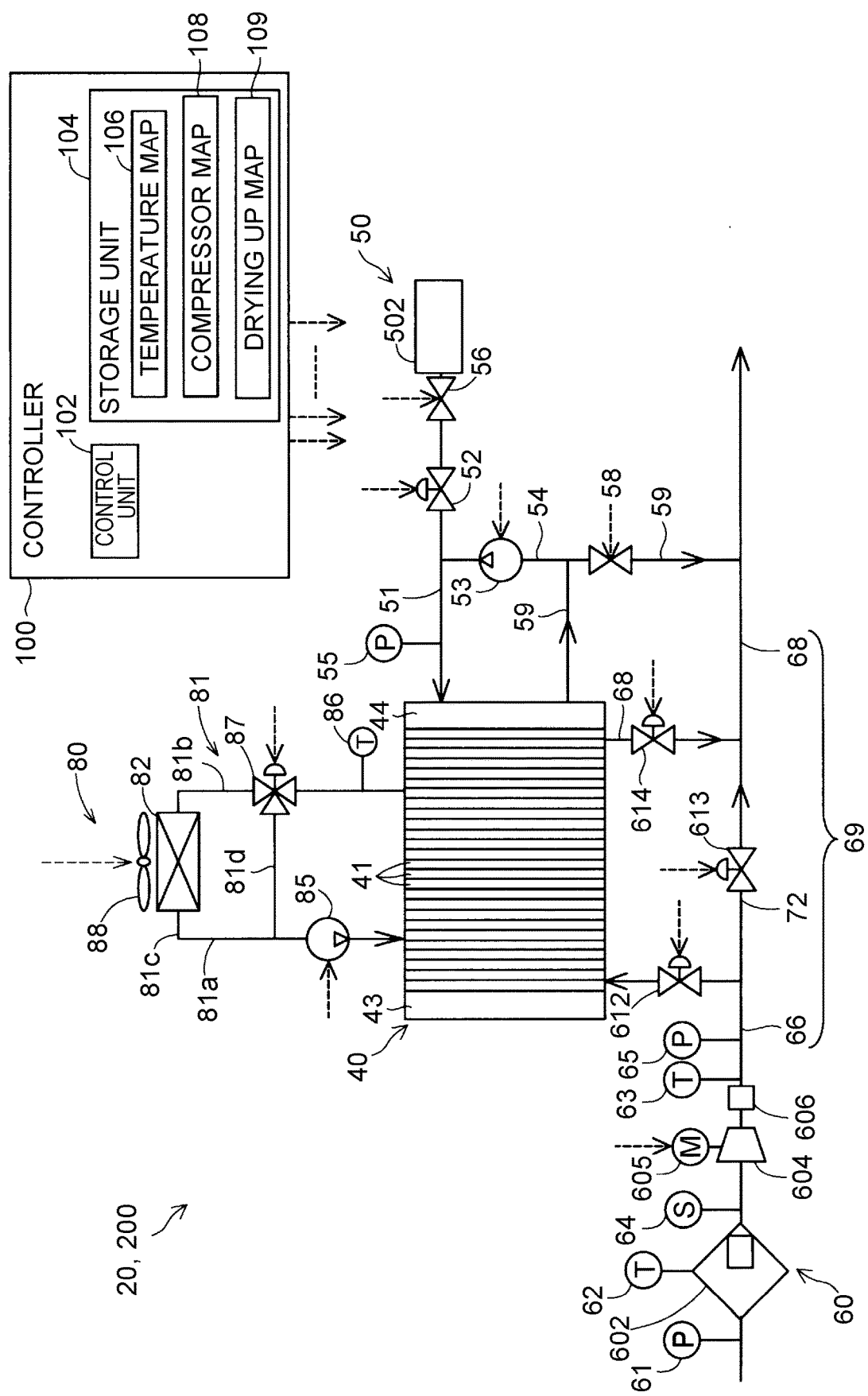
FIG. 1 is an explanatory view showing the configuration of a fuel cell system as a first embodiment of the present disclosure.

FIG. 1 is an explanatory view showing the configuration of a fuel cell system 20 as a first embodiment of the present disclosure. The fuel cell system 20 is mounted on a fuel cell vehicle 200 as one aspect of a mobile object. The fuel cell system 20 outputs electric power mainly used as drive power of the fuel cell vehicle 200 in response to a request from a driver. The fuel cell system 20 includes a fuel cell 40, a fuel gas supply and discharge system 50, an oxidant gas supply and discharge system 60, a coolant circulation system 80, and a controller 100.

The controller 100 includes a control unit 102 and a storage unit 104. The control unit 102 controls operation of the fuel cell system 20 by executing various programs stored in the storage unit 104. For example, the control unit 102 controls operation of the fuel cell system 20 with use of a measured atmospheric pressure measured by a later-described atmospheric pressure sensor 61. The storage unit 104 stores, in addition to the various programs, a temperature map 106, a compressor map 108, and a drying up map 109. The temperature map 106 is used for controlling operation of the fuel cell system 20 in accordance with the values of the atmospheric pressure (measured atmospheric pressure). The compressor map 108 represents performance characteristics of the compressor 604. The drying up map 109 shows a relationship between the temperature of the fuel cell 40 and the air pressure of the cathode, which can prevent an electrolyte membrane from drying up.

The fuel cell 40 is a polymer electrolyte fuel cell that generates electric power through electrochemical reaction between oxygen and hydrogen upon receiving supply of oxidant gas and fuel gas as reaction gas. In the present embodiment, the oxidant gas is air, and the fuel gas is hydrogen gas. The fuel cell 40 has a stack structure where a plurality of unit cells 41 is stacked. Each of the unit cells 41 is a power generation element that can individually generate electric power. The unit cells 41 each include a membrane electrode assembly and two separators that hold the membrane electrode assembly therebetween. The membrane electrode assembly has an electrolyte membrane, an anode placed on one surface of the electrolyte membrane, and a cathode placed on the other surface of the electrolyte membrane. The electrolyte membrane is a solid polymer thin film exhibiting high proton conductivity in a wet state that is the state where the electrolyte membrane contains moisture. Provided in a peripheral end portion of each of the unit cells 41 is a manifold for reaction gas (illustration omitted). The manifold extends in a stacking direction of each of the unit cells 41 and is branched and connected to a power generation portion in each of the unit cells 41. The unit cells 41 are fastened in the stacked state while being placed between first and second end plates 43, 44.

The fuel gas supply and discharge system 50 has a fuel gas supply function, a fuel gas discharge function, and a fuel gas circulation function. The fuel gas supply function is for supplying fuel gas to the anode of the fuel cell 40. The fuel gas discharge function is for discharging the fuel gas (also referred to as "fuel exhaust gas") discharged from the anode of the fuel cell 40 to the outside. The fuel gas circulation function is for circulating fuel gas inside the fuel cell system 20.

The fuel gas supply and discharge system 50 includes a fuel tank 502, a fuel gas supply passage 51 as a pipeline, a pressure reduction valve 52, an on-off valve 56, and a pressure sensor 55 on the upstream side of the fuel cell 40. The fuel gas supply passage 51 is a pipeline for supplying hydrogen as fuel gas to the fuel cell 40 (anode to be specific). The fuel tank 502 is filled with high-pressure hydrogen to be supplied to the fuel cell 40. The fuel gas supply passage 51 has an upstream end connected to the fuel tank 502 and a downstream end connected to the fuel cell 40. The on-off valve 56 is provided in the middle of the fuel gas supply passage 51 to open and close the fuel gas supply passage 51 in response to a command of the control unit 102. The pressure reduction valve 52 is provided on the downstream side of the on-off valve 56 in the fuel gas supply passage 51. The pressure reduction valve 52 regulates the pressure of the fuel gas in the fuel gas supply passage 51 when an opening degree of the pressure reduction valve 52 is controlled in response to a command from the control unit 102. The pressure sensor 55 measures the pressure of the fuel gas on the downstream side of a portion connected to the fuel gas circulation passage 54 described later in the fuel gas supply passage 51. The measured pressure is transmitted to the control unit 102.

The fuel gas supply and discharge system 50 further includes a fuel gas discharge passage 59 as a pipeline, a fuel gas circulation passage 54 as a pipeline, a circulation pump 53, and an exhaust valve 58 on the downstream side of the fuel cell 40. The fuel gas discharge passage 59 is a pipeline for discharging fuel gas from the fuel cell 40 (anode to be specific). The exhaust valve 58 is provided in the fuel gas discharge passage 59 to open and close the fuel gas discharge passage 59 in response to a command of the control unit 102. The control unit 102 normally puts the exhaust valve 58 in a closed state. At specified draining timing set in advance, or at discharge timing of inactive gas contained in the fuel exhaust gas, the control unit 102 switches the exhaust valve 58 to an opened state.

The fuel gas circulation passage 54 is a pipeline for returning the fuel gas discharged from the fuel cell 40 to the fuel gas supply passage 51 again. The fuel gas circulation passage 54 has an upstream end connected to an upstream portion of the exhaust valve 58 in the fuel gas discharge passage 59. The fuel gas circulation passage 54 has a downstream end connected to a downstream portion of the pressure reduction valve 52 in the fuel gas supply passage 51. The operation of the circulation pump 53 is controlled in response to a command of the control unit 102. With the operation of the circulation pump 53, the fuel gas in the fuel gas circulation passage 54 is fed into the fuel gas supply passage 51.

The oxidant gas supply and discharge system 60 includes an oxidant gas supply function that supplies oxidant gas to the fuel cell 40, an oxidant gas discharge function that discharges the oxidant gas (also referred to as "oxidant off-gas") discharged from the fuel cell 40 to the outside, and a bypass function that places the supplied oxidant gas at the outside without through the fuel cell 40. The oxidant gas supply and discharge system 60 includes an oxidant gas passage 69 for supplying oxidant gas to the cathode and discharging the oxidant gas discharged from the cathode.

The oxidant gas supply and discharge system 60 includes an oxidant gas supply passage 66, an air cleaner 602, a compressor 604, a motor 605, an intercooler 606, an atmospheric pressure sensor 61, an ambient temperature sensor 62, an air flowmeter 64, a supply gas temperature sensor 63, a delivery-side pressure sensor 65, and an inlet valve 612.

The oxidant gas supply passage 66 is a pipeline placed on the upstream side of the fuel cell 40. The air cleaner 602 is provided on the upstream side of the compressor 604 in the oxidant gas supply passage 66 to remove foreign materials in the air that is supplied to the fuel cell 40. The compressor 604 is provided on the upstream side of the fuel cell 40 in the oxidant gas supply passage 66 to deliver compressed air to the cathode in response to a command from the control unit 102. The compressor 604 is a centrifugal turbo compressor driven by the motor 605 that is operated in response to a command from the control unit 102. The compressor 604 sucks air in the atmosphere, pressurizes the air with rotation of an impeller provided in the compressor 604, and supplies the pressurized air to the delivery side. The intercooler 606 is provided on the downstream side of the compressor 604 in the oxidant gas supply passage 66. The intercooler 606 cools the air compressed and thereby heated by the compressor 604. The inlet valve 612 is a motor valve for regulating a passage resistance of the oxidant gas supply passage 66. In the present embodiment, when the compressor 604 is driven to cause the fuel cell 40 to generate electric power, the opening degree of the inlet valve 612 is set to 100%. When the compressor 604 is stopped to stop electric power generation of the fuel cell 40, the opening degree of the inlet valve 612 is set to 0%.

The atmospheric pressure sensor 61 measures an atmospheric pressure. The atmospheric pressure sensor 61 is placed on the upstream side of the air cleaner 602 in the oxidant gas supply passage 66. The ambient temperature sensor 62 measures the temperature of air as oxidant gas taken into the compressor 604. The ambient temperature sensor 62 is placed on the upstream side of the compressor 604 in the oxidant gas supply passage 66. The placement positions of the atmospheric pressure sensor 61 and the ambient temperature sensor 62 are not limited to the positions disclosed. They may be any positions as long as the atmospheric pressure and the ambient temperature can be measured. The air flowmeter 64 measures the flow rate of oxidant gas sucked into the compressor 604. The air flowmeter 64 is placed on the upstream side of the compressor 604 in the oxidant gas supply passages 66. The supply gas temperature sensor 63 measures the temperature of air as the oxidant gas delivered from the compressor 604. The delivery-side pressure sensor 65 measures the pressure of air as the oxidant gas delivered from the compressor 604. The measurement value of the delivery-side pressure sensor 65 is substantially identical to the pressure in the cathode of the fuel cell 40. The supply gas temperature sensor 63 and the delivery-side pressure sensor 65 are placed on the downstream side of the compressor 604 in the oxidant gas supply passage 66. The measurement values measured by the various sensors 61, 62, 63, 64, 65 are transmitted to the control unit 102.

The oxidant gas supply and discharge system 60 further includes a bypass passage 72, a flow dividing valve 613 placed at the bypass passage 72, an oxidant gas discharge passage 68, and a pressure-regulating valve 614 placed in the oxidant gas discharge passage 68 positioned on the downstream side of the fuel cell 40.

The bypass passage 72 is a pipeline having one end connected to the oxidant gas supply passage 66 and the other end connected to the oxidant gas discharge passage 68. The bypass passage 72 is for discharging the air delivered from the compressor 604 to the outside without via the fuel cell 40. The flow dividing valve 613 is a motor valve having an opening degree changeable in response to a command from the control unit 102. When the opening degree of the flow dividing valve 613 is changed, the passage resistance of the bypass passage 72 is changed, and the flow rate of the air flowing from the oxidant gas supply passage 66 into the bypass passage 72 is regulated.

The oxidant gas discharge passage 68 is a pipeline for discharging air as oxidant off-gas from the cathode of the fuel cell 40. The pressure-regulating valve 614 is a motor valve having an opening degree changeable in response to a command from the control unit 102. When the opening degree of the pressure-regulating valve 614 is changed, the passage resistance of the oxidant gas discharge passage 68 is changed, and a back pressure of the cathode-side passage of the fuel cell 40 is regulated.

The coolant circulation system 80 includes a coolant circulation passage 81, a water pump 85, a radiator 82, a radiator fan 88, a three-way valve 87, and a temperature sensor 86. The coolant circulation system 80 regulates the temperature of the fuel cell 40 with water as a coolant. The coolant circulation passage 81 includes a coolant supply passage 81a, a coolant discharge passage 81b, a radiator passage 81c, and a coolant bypass passage 81d.

The coolant supply passage 81a is a pipeline for supplying a coolant to the fuel cell 40. The water pump 85 pumps out the coolant of the coolant supply passage 81a to the fuel cell 40 in response to a command of the control unit 102. The coolant discharge passage 81b is a pipeline for discharging the coolant from the fuel cell 40. The temperature sensor 86 is provided in the coolant discharge passage 81b to measure the temperature of the coolant discharged from the fuel cell 40. The measurement value measured by the temperature sensor 86 is transmitted to the control unit 102. Here, the temperature measured by the temperature sensor 86 is substantially equal to the temperature inside the fuel cell 40. Therefore, in the present embodiment, control is performed on the assumption that the temperature measured by the temperature sensor 86 is the temperature of the fuel cell 40.

The radiator passage 81c is a pipeline that connects the coolant supply passage 81a and the coolant discharge passage 81b. The radiator 82 is placed in the radiator passage 81c. The radiator 82 is equipped with a radiator fan 88. The radiator fan 88 sends out wind to the radiator 82 in response to a command from the control unit 102, and controls the level of heat radiation from the radiator 82.

The coolant bypass passage 81d is a pipeline for passing the coolant of the coolant discharge passage 81b to the coolant supply passage 81a without through the radiator 82. The three-way valve 87 is placed at a joint portion between the coolant bypass passage 81d and the coolant discharge passage 81b. The three-way valve 87 regulates the flow rate of the coolant passing from the coolant discharge passage 81b to the radiator passage 81c, and the flow rate of the coolant passing from the coolant discharge passage 81b to the coolant bypass passage 81d in response to a command from the control unit 102.

Figure 2:
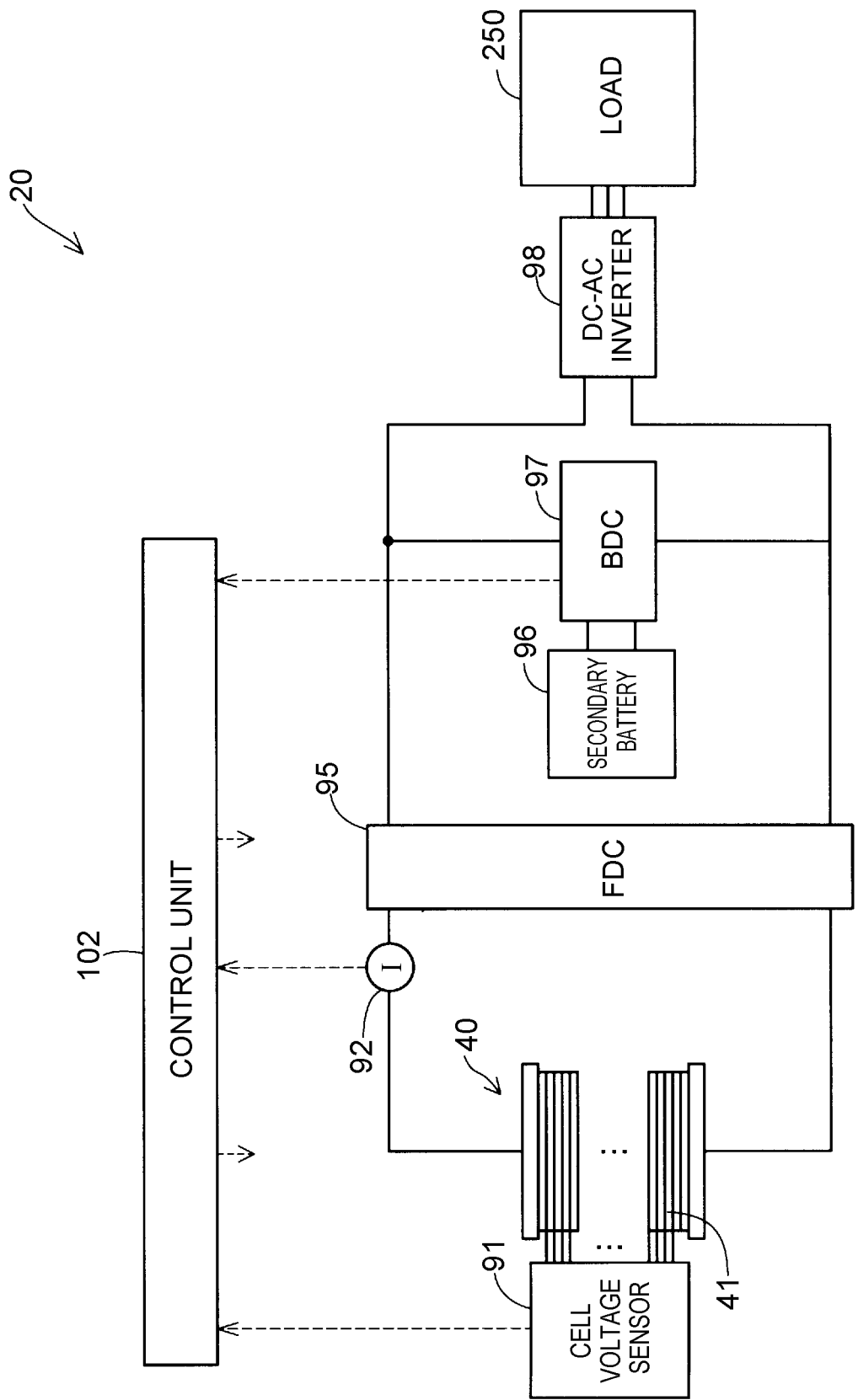
FIG. 2 is a schematic view showing an electrical configuration of the fuel cell system.

FIG. 2 is a schematic view showing an electrical configuration of the fuel cell system 20. The fuel cell system 20 includes a secondary battery 96, an FDC 95, a DC-AC inverter 98, a BDC 97, a cell voltage sensor 91, and a current sensor 92.

The cell voltage sensor 91 is connected to each of all the unit cells 41 in the fuel cell 40 to measure the cell voltage of each of all the unit cells 41. The cell voltage sensor 91 transmits the measurement results to the control unit 102. The current sensor 92 measures the value of an output current of the fuel cell 40, and transmits the value to the control unit 102.

The FDC 95 and the BDC 97 are circuitry constituted as DC-DC converters. The FDC 95 controls the output current of the fuel cell 40 based on a current command value transmitted from the control unit 102. The current command value is a value used as a target value of the output current from the fuel cell 40 and set by the control unit 102. The control unit 102 generates the current command value by calculating a request current value with use of a request electric power amount of the fuel cell 40. The control unit 102 determines the request electric power amount in response to, for example, the accelerator operation amount of the fuel cell vehicle 200.

The FDC 95 has a function as an input voltage meter and an impedance meter. Specifically, the FDC 95 measures the value of an input voltage and transmits the value to the control unit 102. The FDC 95 measures the impedance of the fuel cell 40 by using an alternating current impedance method. The frequency of impedance used in the present embodiment includes radio frequencies, and more specifically includes 100 Hz to 1 kHz. The FDC 95 boosts the input voltage and supplies the voltage to the DC-AC inverter 98.

The BDC 97 controls charge and discharge of the secondary battery 96 in response to a command of the control unit 102. The BDC 97 measures a state of charge (SOC) (remaining capacity) of the secondary battery 96, and transmits the SOC to the control unit 102. The secondary battery 96 is constituted of a lithium ion battery, and functions as an auxiliary power source. The secondary battery 96 supplies electric power to the fuel cell 40, and charges the electric power generated by the fuel cell 40.

The DC-AC inverter 98 is connected to the fuel cell 40 and a load 250. The DC-AC inverter 98 converts direct-current electric power output from the fuel cell 40 and the secondary battery 96 into alternating-current electric power, and supplies the alternating-current electric power to the load 250.

Regenerative electric power generated in the load 250 is converted into a direct current by the DC-AC inverter 98, and is used by the BDC 97 to charge the secondary battery 96. The control unit 102 calculates the output command value in consideration of the SOC of the secondary battery 96 as well as the load 250.

Figure 3:
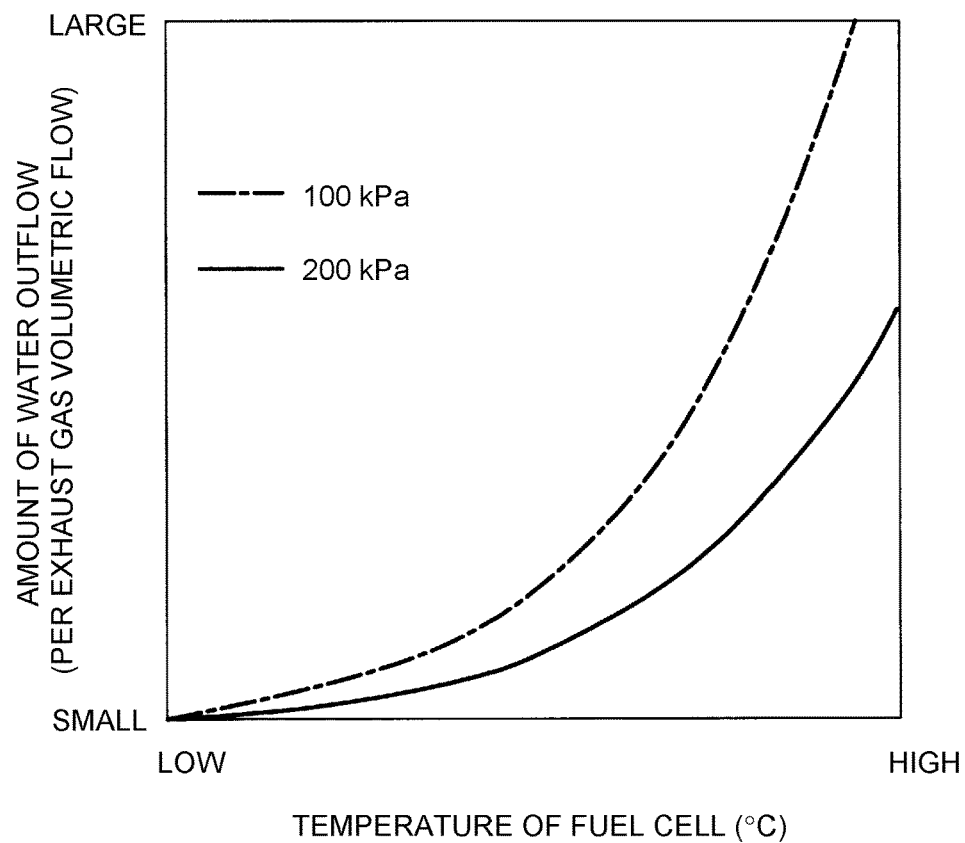
FIG. 3 shows a relationship between the temperature of the fuel cell and the amount of water outflow from the fuel cell.

FIG. 3 shows a relationship between the temperature of the fuel cell 40 and the amount of water outflow from the fuel cell 40. A dashed dotted curve line represents a relationship when the supply pressure of air supplied to the cathode is 100 kPa, while a solid curve line represents a relationship when the supply pressure of air supplied to the cathode is 200 kPa. As shown in FIG. 3, as the temperature of the fuel cell 40 becomes higher, the amount of water (vapor) discharged from the fuel cell 40, together with the oxidant gas discharged from the cathode, exponentially increases irrespective of the magnitude of the supply pressure (delivery pressure of the compressor 604). Meanwhile, as the supply pressure (delivery pressure of the compressor 604) of air supplied to the cathode becomes higher, the discharge amount of water decreases even though the temperature of the fuel cell is the same.

Figure 4:
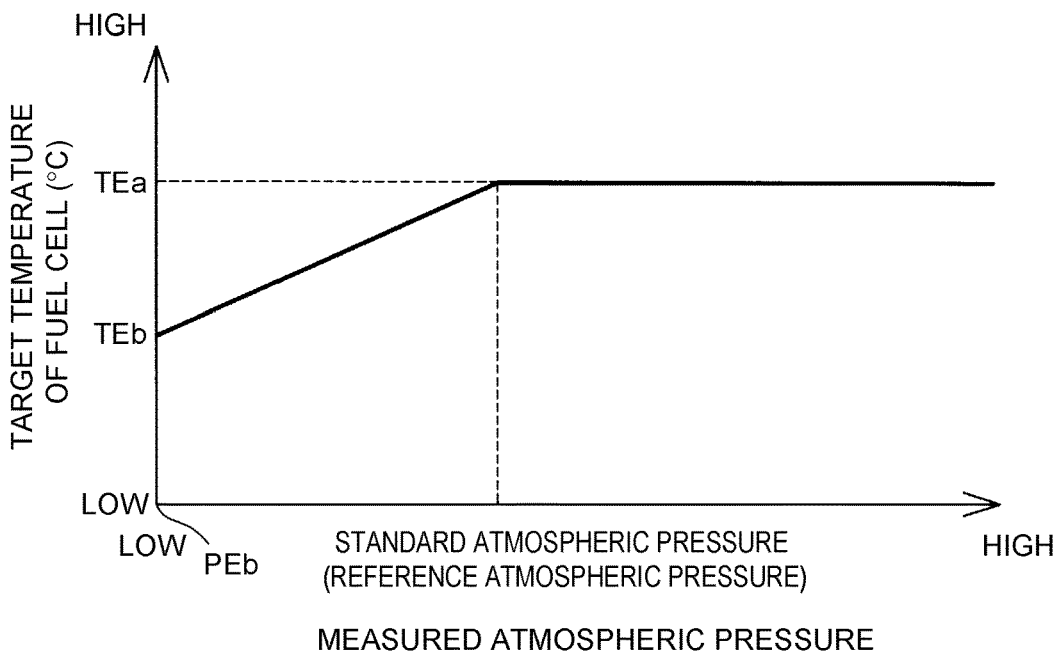
FIG. 4 is an explanatory view of a temperature map.

FIG. 4 is an explanatory view of the temperature map 106. The temperature map 106 is a map that associates a target temperature of the fuel cell with a measured atmospheric pressure measured by the atmospheric pressure sensor 61 for every request current value. FIG. 4 shows a relationship between the target temperature and the measured atmospheric pressure at a certain request current value. The temperature map 106 defines the relationship, for every request current value, in which the target temperature of the fuel cell decreases as the measured atmospheric pressure becomes lower than a predetermined reference atmospheric pressure. In the temperature map 106 at a certain request current value shown in FIG. 4, when the measured atmospheric pressure is equal to the reference atmospheric pressure, the target temperature is "TEa", whereas when the measured atmospheric pressure is "PEb" that is lower than the reference atmospheric pressure, the target temperature is "TEb" that is lower than "TEa." For example, the temperature TEa is 60° C. and the temperature TEb is 40° C. The reference atmospheric pressure is set to a standard atmospheric pressure in the present embodiment. In the temperature map 106, the target temperature of the fuel cell 40 is set to a constant value when the measured atmospheric pressure is equal to or more than the reference atmospheric pressure. In the temperature map 106, the target temperature of the fuel cell 40 is set to the temperature that does not cause the electrolyte membrane to dry up, when the delivery pressure of the compressor map 108 is lowered with decrease of the measured atmospheric pressure.

Figure 5:
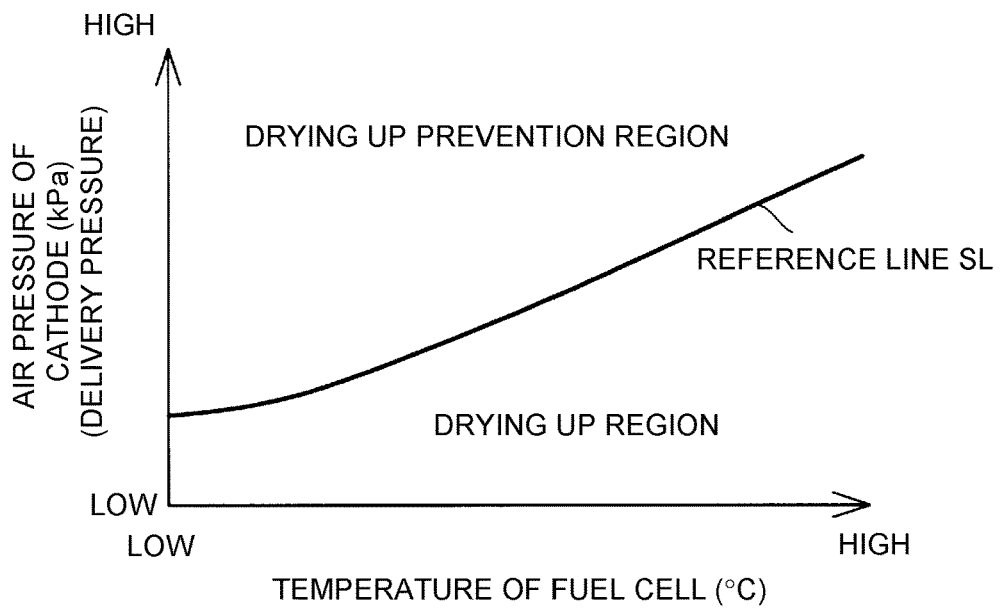
FIG. 5 shows a drying up map.

Description is now given of a method for deriving the temperature map 106 defined with the measured atmospheric pressure and the target temperature of the fuel cell 40. FIG. 5 shows the drying up map 109. The drying up map 109 shows a relationship between the temperature of the fuel cell 40 and the air pressure of the cathode, which can prevent the electrolyte membrane from drying up. The drying up map 109 shown in FIG. 5 is obtained by experiments. Drying up is the state where the electrolyte membrane has a low wet degree, which significantly deteriorates the power generation efficiency of the fuel cell 40. For example, when the impedance of the fuel cell 40 exceeds a predetermined threshold value, occurrence of drying up can be determined. The measurement value of the temperature sensor 86 (FIG. 1) is used as the temperature of the fuel cell 40. The air pressure as a vertical axis of FIG. 5 represents the air pressure within the cathode of the fuel cell 40. As the air pressure, a measurement value of the delivery-side pressure sensor 65 (FIG. 1) is used. In FIG. 5, drying up does not occur in a region above a reference line SL (drying up prevention region), whereas drying up occurs in a region below the reference line SL (drying up region). The control unit 102 determines the delivery pressure in the drying up prevention region as a target delivery pressure by referring to the drying up map 109.

Figure 6:
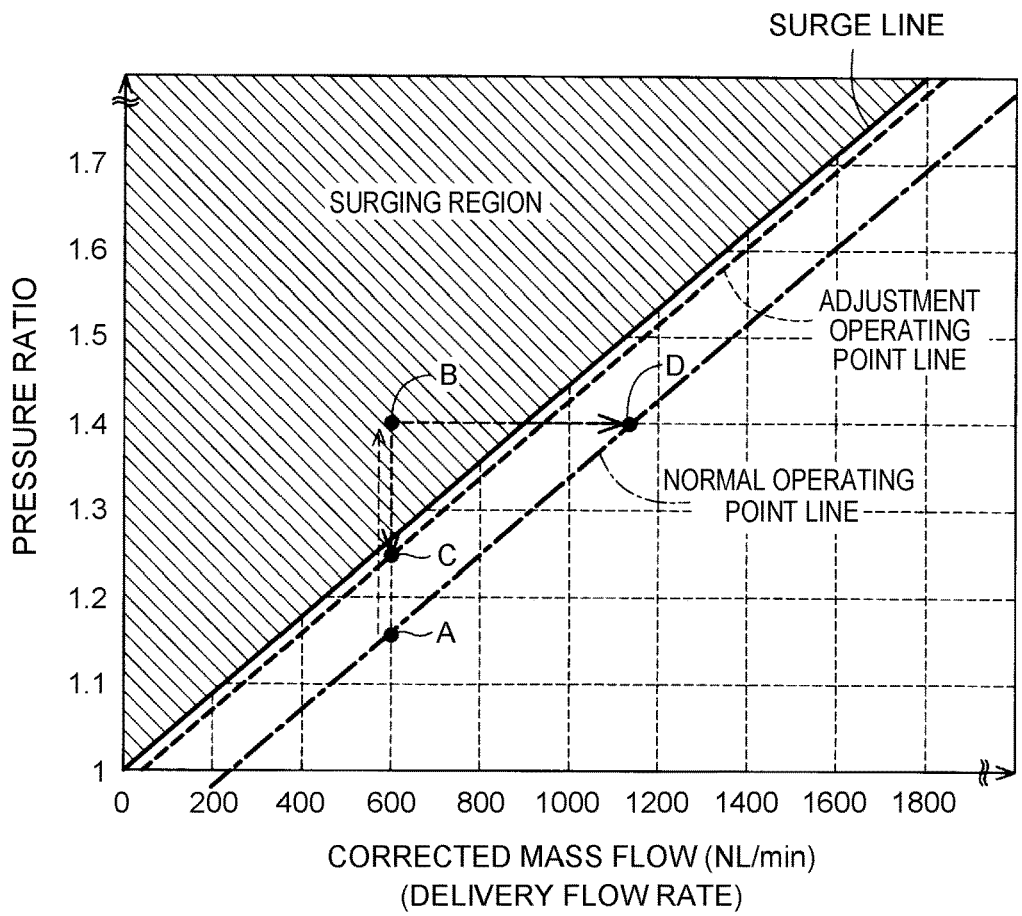
FIG. 6 shows a compressor map representing performance characteristics of a compressor.

FIG. 6 shows the compressor map 108 representing performance characteristics of the compressor 604. In FIG. 6, a vertical axis represents a pressure ratio of the compressor 604, while a horizontal axis represents a delivery flow rate of the compressor 604. An operating point of the compressor 604 is defined with a combination of the pressure ratio and the delivery flow rate. A surging region is a region of the operating points where surging occurs in the compressor 604. A surge line is a line indicative of a boundary of the range of the operating points not included in the surging region. The pressure ratio is a ratio of a suction-side air pressure (suction pressure) to a delivery-side air pressure (delivery pressure) of the compressor 604. The control unit 102 calculates a target delivery flow rate of air with a following expression (1). The delivery flow rate in the following expression (1) is also called a corrected mass flow.

$$\text{delivery flow rate} = \text{flow rate} \cdot (\text{standard air pressure}/\text{suction air pressure})\sqrt{(\text{suction air temperature}/\text{standard air temperature})} \quad (1)$$

A flow rate (NL/min) is a mass flow rate of air sucked by the compressor 604. The mass flow rate is determined by the control unit 102 with use of a target value of the request current (target request current value) of the fuel cell 40. The control unit 102 determines the flow rate for the request current value by, for example, referring to the map showing a relationship between the flow rate and the request current value. The map is stored in the storage unit 104, for example. The temperature of suction air is a measurement value of the ambient temperature sensor 62 (FIG. 1). The standard air temperature is the temperature of suction air used as a reference, and the temperature is a predetermined value (for example, 25° C.). The suction air pressure is the pressure of actual air sucked by the compressor 604, and the pressure is a measurement value of the atmospheric pressure sensor 61 (FIG. 1). The standard air pressure is a reference pressure for the air sucked by the compressor 604, and the pressure is a predetermined value (for example, standard atmospheric pressure).

Consider the case where, as shown in FIG. 6, the control unit 102 operates the compressor 604 at an operating point A under the environment of standard atmospheric pressure, and then the fuel cell vehicle 200 moves to an upland. As the fuel cell vehicle 200 moves to the upland, the measured atmospheric pressure becomes lower than a reference atmospheric pressure. In this case, the operating point shifts from the operating point A to an operating point B (hereinafter, also referred to as an operating point after lowering). That is, when it is attempted to achieve the same delivery pressure as in the operating point A in the compressor 604, the pressure ratio increases with decrease of the atmospheric pressure. Depending on the level of increase in the pressure ratio, the operating point A may shift to the operating point after lowering (i.e., the operating point B) that is positioned in the surging region. Here, under the condition where the atmospheric pressure becomes lower than the standard atmospheric pressure, it may be considered to shift the operating point from the operating point A to an operating point D positioned outside the surging region in order to achieve the same delivery pressure as in the operating point A, while avoiding operation of the compressor 604 in the operating point after lowering (the operating point B). However, when the compressor 604 is operated in the operating point D, the delivery flow rate becomes larger than that in the operating point A. Hence, it becomes necessary to open the flow dividing valve 613 (FIG. 1) to pass the air corresponding to the increased flow rate to the bypass passage 72. That is, when the operating point of the compressor 604 is shifted from the operating point A to the operating point D, the delivery flow rate of the compressor 604 needs to be larger than the flow rate of air requested from the fuel cell 40. Therefore, there is a possibility that the fuel efficiency of the fuel cell system 20 may deteriorate due to the increase in power consumption by the compressor 604.

Meanwhile, the following control can be considered in the case where the compressor 604 is operated at an operating point positioned outside the surging region, while the delivery flow rate of the compressor 604 is maintained under the condition where the atmospheric pressure becomes lower than standard atmospheric pressure. That is, when an operating point shifts from the operating point A to the operating point after lowering (the operating point B) due to decrease of the atmospheric pressure, the control unit 102 increases the opening degree of the pressure-regulating valve 614 (FIG. 1) to lower the delivery pressure, and thereby operates the compressor 604 in the operating point C positioned outside the surging region. However, since the amount of water outflow from the fuel cell 40 increases due to the lowered delivery pressure as shown in FIG. 3, a possibility that the electrolyte membrane dries up may be generated.

Therefore, in the present embodiment, the control unit 102 determines the temperature of the fuel cell 40 and the delivery pressure of the compressor 604, which can suppress discharge of air to the outside with the bypass passage 72 while suppressing drying up of the electrolyte membrane, even when the atmospheric pressure becomes lower than the standard atmospheric pressure. Specifically, for every value of the atmospheric pressure that is lower than the standard atmospheric pressure, an operating point of the compressor 604 where the delivery pressure of the compressor 604 is lower than the delivery pressure under the standard atmospheric pressure is derived as an adjustment operating point with use of the compressor map 108 shown in FIG. 6. Next, with use of the relationship shown in FIG. 5, the control unit 102 sets a target temperature of the fuel cell 40 that does not cause drying up of the electrolyte membrane with the delivery pressure at each of the adjustment operating points. An adjustment operating point line shown in FIG. 6 is a line connecting the adjustment operating points derived when the atmospheric pressure is the atmospheric pressure PEb (FIG. 4). A normal operating point line is a line connecting the operating points when the atmospheric pressure is the standard atmospheric pressure or more.

Figure 7:
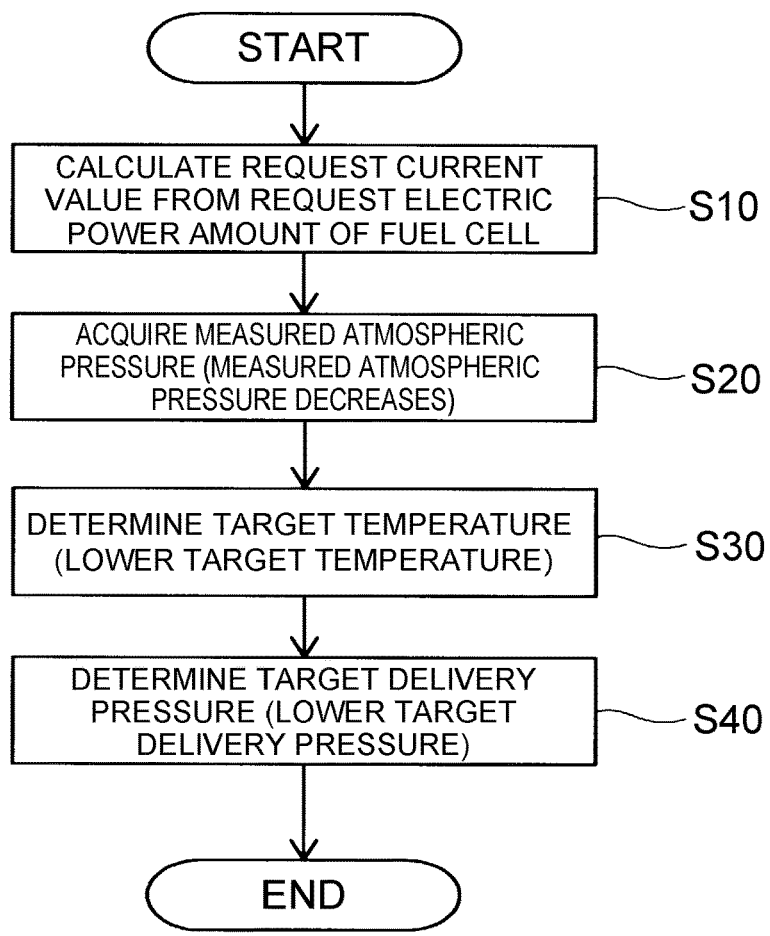
FIG. 7 is a first flowchart of control executed by a control unit.

FIG. 7 is a first flowchart of control executed by the control unit 102. The routine of the first flowchart is repeatedly executed at fixed time intervals while a start-up switch of the fuel cell vehicle is in an ON state.

First, the control unit 102 calculates a request current value from the request electric power amount of the fuel cell 40 (step S10). The control unit 102 acquires a measured atmospheric pressure of the atmospheric pressure sensor 61 (step S20).

Next, the control unit 102 determines a target temperature of the fuel cell 40 with the temperature map 106 (FIG. 4) (step S30). Next, the control unit 102 determines a target delivery pressure of the compressor 604 corresponding to the target temperature of the fuel cell 40 with the drying up map 109 (FIG. 5) (step S40). For example, when the measured atmospheric pressure is a reference atmospheric pressure in the previous routine, and the measured atmospheric pressure decreases from the reference atmospheric pressure in the present routine (step S20), the control unit 102 executes the following control in steps S30 to S40. First, as the measured atmospheric pressure decreases, the target temperature of the fuel cell 40 is lowered (step S30) with use of the temperature map 106 (FIG. 4). The control unit 102 also lowers the target delivery pressure of the compressor 604 with lowering of the target temperature of the fuel cell 40 with use of the drying up map 109 (step S40).

Figure 8:
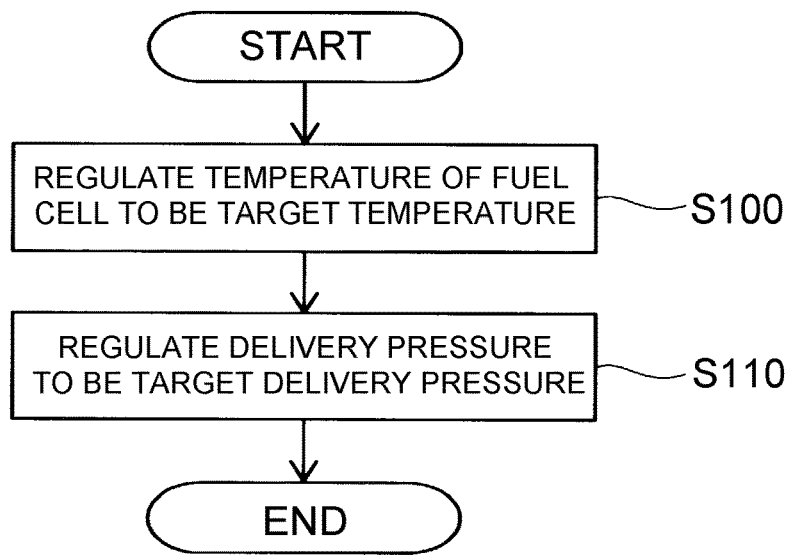
FIG. 8 is a second flowchart of control executed by the control unit.

FIG. 8 is a second flowchart of control executed by the control unit 102. After determining the target temperature and the target delivery pressure in steps S30, S40, the control unit 102 executes the second flowchart. That is, the control unit 102 controls the coolant circulation system 80 to regulate the temperature of the fuel cell 40 to be the target temperature (step S100). For example, when the target temperature becomes lower than the target temperature of the previous routine, the control unit 102 lowers the temperature of the fuel cell 40 with at least one control method of the coolant circulation system 80, out of a first method and a second method shown below.

First Method

The flow rate of a coolant supplied to the fuel cell 40 is increased with the water pump 85.

Second Method

The three-way valve 87 is controlled to increase the flow rate of the coolant flowing through the radiator passage 81c.

Next, the control unit 102 controls the opening degree of the pressure-regulating valve 614 (FIG. 1) to regulate the delivery pressure to be the target delivery pressure (step S110). For example, when the target delivery pressure becomes lower than the target delivery pressure of the previous routine, the control unit 102 increases the opening degree of the pressure-regulating valve 614 to lower the delivery pressure. Here, when the opening degree of the pressure-regulating valve 614 is increased, a passage resistance of the oxidant gas supply passage 66 decreases, and the delivery flow rate of the compressor 604 increases. Therefore, in order to maintain the delivery flow rate constant, the control unit 102 lowers the speed of the compressor 604. As described above, when the measured atmospheric pressure becomes lower than the reference atmospheric pressure, the control unit 102 executes temperature and pressure lowering control for controlling the coolant circulation system 80 to lower the temperature of the fuel cell 40, and controlling the pressure-regulating valve 614 to lower the delivery pressure of the compressor 604 (steps S30, S40, S100, S110).

According to the first embodiment, as the measured atmospheric pressure becomes lower than the predetermined reference atmospheric pressure, the control unit 102 controls the coolant circulation system 80 to lower the temperature of the fuel cell 40 (steps S20, S40 of FIG. 7, step S100 of FIG. 8). When the measured atmospheric pressure becomes lower than the predetermined reference atmospheric pressure, the control unit 102 controls the pressure-regulating valve 614 to lower the delivery pressure of the compressor 604 (step S50 of FIG. 7, step S110 of FIG. 8). Thus, as the measured atmospheric pressure becomes lower than the reference atmospheric pressure, the delivery pressure of the compressor 604 is lowered. Hence, the possibility that the operating point of the compressor 604 is positioned within the surging region can be reduced without increase in the delivery flow rate. This makes it possible to suppress increase in power consumption of the compressor 604 attributed to increase in the delivery flow rate. Since the increase in the power consumption of the compressor 604 can be suppressed, the electric power amount of the fuel cell 40 supplied to the compressor 604 can be reduced. As a result, the increase in the power generation amount of the fuel cell 40 can be suppressed, and therefore the increase in temperature of the fuel cell 40 can be suppressed. Moreover, it is not necessary to increase the delivery flow rate of the compressor 604 when the measured atmospheric pressure becomes lower than the reference atmospheric pressure. Hence, the possibility of deterioration in the efficiency of the fuel cell system 20 can be reduced. That is, according to the fuel cell system 20, it is not necessary to discharge the air, corresponding to an increased delivery flow rate, to the outside from the bypass passage 72.

According to the first embodiment, the control unit 102 controls, by referring to the temperature map 106, the coolant circulation system 80 to regulate the temperature of the fuel cell 40 to be the target temperature that is defined based on the request current value and the measured atmospheric pressure (step S30 of FIG. 7, step S100 of FIG. 8). The target temperature of the fuel cell 40 is set to the temperature that does not cause drying up of the electrolyte membrane. This makes it possible to suppress the drying up of the electrolyte membrane when the delivery pressure of the compressor 604 is lowered. Accordingly, since it is not necessary to provide a humidifier for humidifying the electrolyte membrane to the fuel cell system 20, cost increase in the fuel cell system 20 can be suppressed.

B. Second Embodiment

Figure 9:
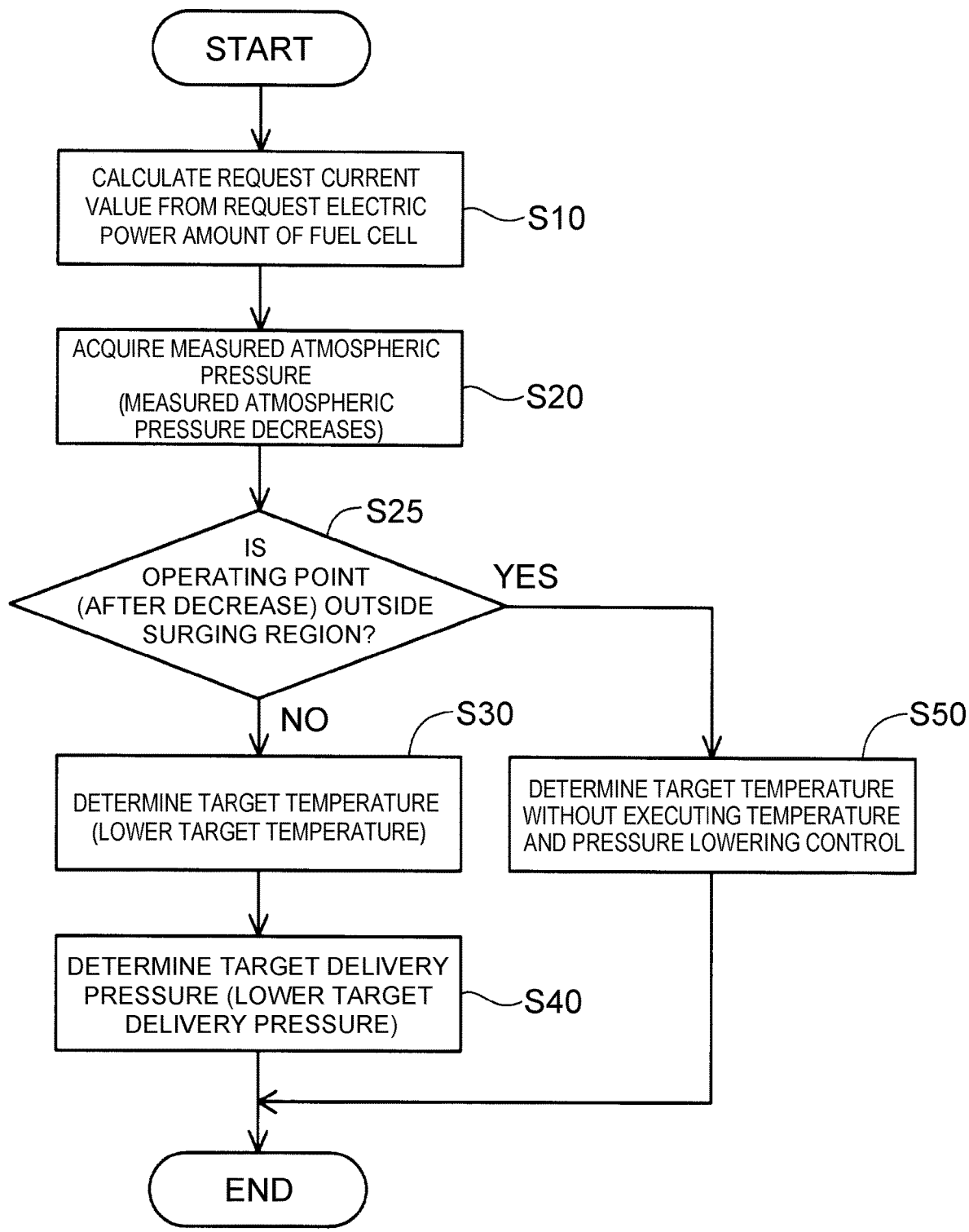
FIG. 9 is a first flowchart of a second embodiment executed by the control unit.

In the first embodiment, when the measured atmospheric pressure becomes lower than the reference atmospheric pressure, the control unit 102 uniformly lowers the temperature of the fuel cell 40 and lowers the delivery pressure of the compressor 604. However, the present disclosure is not limited to this. Hereinafter, a second embodiment of the first flowchart executed by the control unit 102 will be described. FIG. 9 is a first flowchart of a second embodiment executed by the control unit 102. The flowchart is different from the first flowchart (FIG. 7) of the first embodiment in the point that steps S25, S50 are newly provided. Since other steps are similar to those in the first flowchart of the first embodiment, the similar steps are designated by similar numerals to omit the description thereof. The routine of the first flowchart in the second embodiment is repeatedly executed at fixed time intervals while a start-up switch of the fuel cell vehicle 200 is in an ON state, as in the routine of the first flowchart of the first embodiment.

After step S20, the control unit 102 determines whether or not the operating point of the compressor map 108 is positioned outside the surging region due to change in the measured atmospheric pressure (step S25). That is, in step S25, the control unit 102 determines whether or not the operating point shifts from the outside of the surging region to the inside of the surging region due to change in the pressure ratio of the compressor 604 caused by change in the suction pressure of the compressor 604. When determining in step S25 that the operating point is positioned outside the surging region, the control unit 102 determines the target temperature of the fuel cell 40 without executing the temperature and pressure lowering control (step S50). That is, in step S50, the target temperature that offers sufficient power generation efficiency of the fuel cell 40 can be determined without executing temperature control in the temperature and pressure lowering control. For example, the control unit 102 maintains a current target temperature without lowering the temperature in step S50.

Meanwhile, when determining that the operating point is not positioned outside the surging region, i.e., the operating point is within the surging region in step S25, the control unit 102 determines the target temperature of the fuel cell 40 with the temperature map 106 (FIG. 4) (step S30). When determining the operating point is not positioned outside the surging region, the control unit 102 determines the target delivery pressure of the compressor 604 corresponding to the target temperature of the fuel cell 40 with reference to the drying up map 109 (FIG. 5) (step S40).

For example, when the measured atmospheric pressure is a reference atmospheric pressure in the previous routine, and the measured atmospheric pressure decreases from the reference atmospheric pressure of the present routine (step S20), the control unit 102 executes the following control in steps S25 to S50. First, the control unit 102 makes determination of step S25 as described above. When making a determination of "Yes" in step S25, the control unit 102 determines the target temperature of the fuel cell 40 without executing the temperature and pressure lowering control (step S50). When making a determination of "No" in step S25, the control unit 102 lowers the target temperature of the fuel cell 40 with decrease of the measured atmospheric pressure, with use of the temperature map 106 (FIG. 4) (step S30). The control unit 102 also lowers the target delivery pressure of the compressor 604 with the lowering of the target temperature of the fuel cell 40 with reference to the drying up map 109 (step S40). In step S40, the target delivery pressure is determined such that the operating point is positioned outside the surging region.

After the first flowchart in the second embodiment is executed, the same process as the second flowchart (FIG. 8) of the first embodiment is executed. In step S110 of the second embodiment, the delivery pressure of the compressor 604 is lowered in order to shift the operating point from the operating point A to the operating point C positioned outside the surging region as shown in FIG. 6, for example. When the target temperature is determined in step S50 in FIG. 9, the coolant circulation system 80 is controlled to regulate the temperature of the fuel cell 40 to be the determined target temperature. At the same time, the compressor 604 is operated at the operating point where the suction pressure is equal to the measured atmospheric pressure while the delivery pressure is maintained.

The second embodiment demonstrates the same effect as the first embodiment since the second embodiment has the same configuration as the first embodiment. According to the second embodiment, when the operating point after lowering is positioned within the surging region, the compressor 604 is operable at the operating point positioned outside the surging region by execution of the temperature and pressure lowering control. According to the second embodiment, when the operating point after lowering is positioned outside the surging region, the temperature and pressure lowering control is not executed. Hence, it becomes possible to cause the fuel cell 40 to generate electric power under the temperature condition that offers sufficient power generation efficiency of the fuel cell 40 without executing temperature control in the temperature and pressure lowering control.

C. Other Embodiments

According to each of the aforementioned embodiments, a centrifugal turbo compressor is used as the compressor 604. However, the present disclosure is not limited to this. For example, the compressor 604 may be an axial turbo compressor, or may be a volumetric compressor. In each of the embodiments, the reference atmospheric pressure is the standard atmospheric pressure. However, without being limited thereto, the reference atmospheric pressure may be lower or higher than the standard atmospheric pressure. The standard atmospheric pressure may be an atmospheric pressure in the altitude where the fuel cell vehicle 200 generally travels, for example. According to each of the embodiments, the fuel cell system 20 includes the temperature map 106, the compressor map 108, and the drying up map 109 (FIG. 1). However, external servers may store these maps 106, 108, 109, and the controller 100 may refer to the maps 106, 108, 109 stored in the external servers.

The present disclosure is not limited to the embodiments disclosed and various modified examples are included therein. For example, the above-mentioned embodiments have been described in detail for easy understanding of the present disclosure. The present disclosure, therefore, is not necessarily limited to those including all the component members described therein. Some of the component members in one of the embodiments may be replaced with the component members of other modifications, and the component members of one of the embodiments may be added to the component members of other modifications. Moreover, it is possible to delete and replace some of the component members of each of the embodiments and to add other component members thereto. The embodiments, modifications, and modified examples may also be combined.

What is claimed is:

1. A fuel cell system, comprising:
a fuel cell having an anode, a cathode, and an electrolyte membrane;
an oxidant gas passage for supplying oxidant gas to the cathode and discharging the oxidant gas from the cathode;
an oxidant gas supply and discharge system having a compressor provided on an upstream side of the fuel cell in the oxidant gas passage, and a pressure-regulating valve provided on a downstream side of the fuel cell in the oxidant gas passage;
a coolant circulation system configured to circulate a coolant that regulates a temperature of the fuel cell;
an atmospheric pressure sensor that measures an atmospheric pressure; and
a control unit configured to control operation of the fuel cell system with use of the measured atmospheric pressure measured by the atmospheric pressure sensor, wherein
when the measured atmospheric pressure becomes lower than a predetermined reference atmospheric pressure, the control unit is configured to execute temperature and pressure lowering control for controlling the coolant circulation system to lower the temperature of the fuel cell while controlling the pressure-regulating valve to lower a delivery pressure of the compressor;
wherein the control unit is configured to
change an operating point to an operating point after lowering without execution of the temperature and pressure lowering control, when the operating point after lowering is positioned outside a surging region where surging occurs in the compressor, the operating point after lowering being an operating point defined with a delivery flow rate and a pressure ratio of the compressor after the measured atmospheric pressure becomes lower than the reference atmospheric pressure, and
execute the temperature and pressure lowering control such that the operating point is outside the surging region, when the operating point after lowering is positioned within the surging region.

2. A fuel cell system, comprising:
a fuel cell having an anode, a cathode, and an electrolyte membrane;
an oxidant gas passage for supplying oxidant gas to the cathode and discharging the oxidant gas from the cathode;
an oxidant gas supply and discharge system having a compressor provided on an upstream side of the fuel cell in the oxidant gas passage, and a pressure-regulating valve provided on a downstream side of the fuel cell in the oxidant gas passage;
a coolant circulation system configured to circulate a coolant that regulates a temperature of the fuel cell;
an atmospheric pressure sensor that measures an atmospheric pressure; and
a control unit configured to control operation of the fuel cell system with use of the measured atmospheric pressure measured by the atmospheric pressure sensor, wherein
when the measured atmospheric pressure becomes lower than a predetermined reference atmospheric pressure, the control unit is configured to execute temperature and pressure lowering control for controlling the coolant circulation system to lower the temperature of the fuel cell while controlling the pressure-regulating valve to lower a delivery pressure of the compressor;
further comprising a storage unit that is configured to store a map that associates a request current value of the fuel cell, the measured atmospheric pressure, and a target temperature of the fuel cell, wherein
the target temperature of the fuel cell is set to a temperature that does not cause the electrolyte membrane to dry up when the delivery pressure of the compressor is lowered with decrease of the measured atmospheric pressure, and
in the temperature and pressure lowering control, the control unit is configured to control the coolant circulation system to regulate the temperature of the fuel cell to be the target temperature that is defined with the request current value and the measured atmospheric pressure by referring to the map.

3. A control method of a fuel cell system, the fuel cell system including a fuel cell having an anode, a cathode, and an electrolyte membrane, an oxidant gas passage for supplying oxidant gas to the cathode and discharging the oxidant gas from the cathode, an oxidant gas supply and discharge system having a compressor provided on an upstream side of the fuel cell in the oxidant gas passage, and a pressure-regulating valve provided on a downstream side of the fuel cell in the oxidant gas passage, a coolant circulation system that circulates a coolant that regulates a temperature of the fuel cell, and an atmospheric pressure sensor that measures an atmospheric pressure,
the method comprising, when the measured atmospheric pressure measured by the atmospheric pressure sensor becomes lower than a predetermined reference atmospheric pressure,
executing temperature and pressure lowering control for controlling the coolant circulation system to lower the temperature of the fuel cell while controlling the pressure-regulating valve to lower a delivery pressure of the compressor;
changing an operating point to an operating point after lowering without execution of the temperature and pressure lowering control, when the operating point after lowering is positioned outside a surging region where surging occurs in the compressor, the operating point after lowering being an operating point defined with a delivery flow rate and a pressure ratio of the compressor after the measured atmospheric pressure becomes lower than the reference atmospheric pressure, and
executing the temperature and pressure lowering control such that the operating point is outside the surging region, when the operating point after lowering is positioned within the surging region.

* * * * *